United States Patent
Reed

(10) Patent No.: US 6,832,229 B2
(45) Date of Patent: Dec. 14, 2004

(54) SYSTEM AND METHOD FOR MAINTAINING LARGE-GRAINED DATABASE CONCURRENCY WITH A LOG MONITOR INCORPORATING DYNAMICALLY REDEFINABLE BUSINESS LOGIC

(75) Inventor: David Reed, Camas, WA (US)

(73) Assignee: Oracle International Corporation, Redwood Shores, CA (US)

(*) Notice: Subject to any disclaimer, the term of this patent is extended or adjusted under 35 U.S.C. 154(b) by 571 days.

(21) Appl. No.: 09/804,672

(22) Filed: Mar. 9, 2001

(65) Prior Publication Data

US 2002/0128996 A1 Sep. 12, 2002

(51) Int. Cl.[7] ............................................. G06F 17/30
(52) U.S. Cl. ...................... 707/202; 707/200; 707/201; 707/10; 709/203
(58) Field of Search ............................. 707/1, 10, 102, 707/200, 201, 202, 100, 101, 104.1; 709/203

(56) References Cited

U.S. PATENT DOCUMENTS

| | | | | |
|---|---|---|---|---|
| 5,544,359 A | * | 8/1996 | Tada et al. | 707/202 |
| 5,555,404 A | * | 9/1996 | Torbjornsen et al. | 707/202 |
| 5,592,660 A | * | 1/1997 | Yokota et al. | 707/8 |
| 5,903,898 A | * | 5/1999 | Cohen et al. | 707/204 |
| 5,907,848 A | * | 5/1999 | Zaiken et al. | 707/202 |
| 5,970,502 A | * | 10/1999 | Salkewicz et al. | 707/201 |
| 5,991,772 A | * | 11/1999 | Doherty et al. | 707/202 |
| 6,308,168 B1 | * | 10/2001 | Dovich et al. | 707/1 |
| 6,374,252 B1 | * | 4/2002 | Althoff et al. | 707/102 |
| 6,446,074 B1 | * | 9/2002 | Miller et al. | 707/101 |
| 6,480,850 B1 | * | 11/2002 | Veldhuisen | 707/9 |
| 6,484,149 B1 | * | 11/2002 | Jammes et al. | 705/26 |
| 6,609,099 B1 | * | 8/2003 | Matsuzaki | 705/7 |

OTHER PUBLICATIONS

J. Hill, et al., "Data Transformation: Key to Information Sharing," Strategic Analysis Report, Sep. 29, 1998, XP-002223428, 60 pages.

Oracle Corporation, Oracle Warehouse Builder: A Technical Overview, An Oracle Technical White Paper, Feb. 2000, XP-002249154, pp. 1–21.

Surajit Chaudhuri, et al., "An Overview of Data Warehousing and OLAP Technology," Mar. 1997, vol. 26, No. 1, XP-002193792, pp. 65–74.

* cited by examiner

*Primary Examiner*—Greta Robinson
*Assistant Examiner*—Cheryl Lewis
(74) *Attorney, Agent, or Firm*—Craig G. Holmes; Hickman Palermo Truong & Becker LLP

(57) ABSTRACT

A system and method for maintaining large-grained database concurrency with a log monitor incorporating dynamically redefinable business logic are described. Operations expressed in a data manipulation language are executed against a source database. At least one operation constitutes a commit operation that completes each database transaction. A current rule set is defined. Each rule includes business logic specifying a data selection criteria for records stored in the source database. A log entry is periodically generated in a log for each transaction committed to the source database. Each log entry identifies an affected record and includes transactional data. The transaction identified in each log entry is evaluated against the data selection criteria specified in the current rule set. A new record is built in accordance with metadata describing a destination database. The new record contains select transactional data from the log entry of each transaction meeting the selection criteria. The new record is stored into the destination database. The data stored in the destination database includes at least a partial subset of the source database.

28 Claims, 7 Drawing Sheets

70

130

SYSTEM AND METHOD FOR MAINTAINING LARGE-GRAINED DATABASE CONCURRENCY WITH A LOG MONITOR INCORPORATING DYNAMICALLY REDEFINABLE BUSINESS LOGIC

FIELD OF THE INVENTION

The present invention relates in general to database object extraction and, in particular, to a system and method for maintaining large-grained database concurrency with a log monitor incorporating dynamically redefinable business logic.

BACKGROUND OF THE INVENTION

Presently, corporate database management systems fall into two categories: production and informational. Production databases, including operational data stores, function as repositories for real-time or near-real-time data generated by or used in the operation of manufacturing, production, and transactional systems. In contrast, informational databases store data periodically obtained from production databases for use in decision support and on-line analytical processing systems. Informational databases include data warehouses, often structured as enterprise databases and datamarts.

Typically, data warehouses store both informational data and metadata that describe the database structure. At a minimum, informational databases must maintain a degree of large-grained data concurrency with the data stored in the production databases for trend analyses and data derivation.

On-line transaction processing systems are major producers of production data. On-line transaction processing systems require a minimum guaranteed response time with uninterrupted availability, particularly in electronic commerce (e-commerce) systems. The high data volume and the need for high availability require the use of transaction servers rather than slower database servers.

Production data provide the raw grist for decision support and on-line analytical processing systems. These systems analyze data and generate reports for use in the planning and strategic operations of a corporation. The raw production data is transformed into informational data by data mining, replication, and cleansing tools. Decision support and on-line analytical processing systems can tolerate slower response times. Nevertheless, the data needs of these systems must balance against the autonomy required by production systems.

Frequently updating the informational databases can adversely impact the operation of the production systems. On-line transaction processing systems operate near or at total hardware capacity. For instance, a typical e-commerce site can receive over 500 transactions or "hits" per second. Interrupting production system operation to update the informational databases can exacerbate the problem of maintaining the requisite level of availability and responsiveness.

Periodically, production data must be transformed into informational data through the application of business logic during the data retrieval process. Often, the business logic required to retrieve and transform production data is complex and computationally intensive. As well, the business logic is relatively inflexible and static. These factors can further affect system responsiveness.

In the prior art, two solutions for updating informational databases have been proposed. One solution presents a data replication manager that periodically copies production data while transforming the data. Unfortunately, this solution causes extensive data duplication and can be time consuming.

Another prior art solution introduces a multi-tiered database architecture with periodic updating. Business logic is implemented in queries executed against the production database. Second tiered business logic can utilize the retrieved information to populate and update datamarts using department-specific queries. In a rapidly changing environment, excessive updates can drastically disrupt production system operation.

Therefore, there is a need for a data manager capable of updating an informational database with high-frequency and low overhead. This approach would minimize resource expenditures by substantially avoiding data duplication and inefficient data retrieval.

There is a further need for an approach to retrieving informational data with dynamically redefinable parameters. This approach would allow flexible redefinition of business logic for selecting data in an ad hoc fashion.

There is a further need for an approach to non-intrusively updating an informational database. This approach would have minimal effect on a production system operation and respect autonomous operation.

SUMMARY OF THE INVENTION

The present invention provides a system and method for updating a destination database with data indirectly retrieved from a source database through log-based monitoring. A transaction log file is generated as a by-product of transactions committed to a source database by a transaction server. The log file is monitored and evaluated against a dynamic rule set specifying selection criteria implementing business logic. Those log entries satisfying the selection criteria are converted into updated records using metadata describing the schema of a destination database. The rule set and metadata can be dynamically redefined using a database builder tool. The log monitor automatically modifies the selection criteria and record-generation operations. During the data retrieval, the log monitor utilizes information stored in each log entry to indirectly derive informational data with minimal effect on the transaction server operations.

An embodiment of the present invention is a system and method for refreshing an informational database through log-based transaction monitoring. A production database is maintained and includes one or more tables. Each table stores records of production data generated by a transaction processing system. Log entries are periodically stored into a log file. At least one log entry is generated for each transaction committed to the production database. An informational database including one or more tables is maintained. Each table stores records of informational data for use by a decision support system. The log entries stored into the log file are dynamically analyzed using a rule set that specifies a data selection criteria. The updated records generated from production data satisfying the data selection criteria are stored into the informational database.

A further embodiment is a system and method for maintaining large-grained database concurrency with a log monitor incorporating dynamically redefinable business logic. Operations expressed in a data manipulation language are executed against a source database. At least one operation constitutes a commit operation that completes each database transaction. A current rule set is defined. Each rule includes business logic specifying a data selection criteria for records stored in the source database. A log entry is periodically generated in a log for each transaction committed to the source database. Each log entry identifies an affected record and includes transactional data. The transaction identified in each log entry is evaluated against the data selection criteria specified in the current rule set. A new record is built in accordance with metadata describing a destination database. The new record contains select transactional data from the log entry of each transaction meeting the selection criteria. The new record is stored into the destination database. The data stored in the destination database includes at least a partial subset of the source database.

One benefit of the present invention is the ability to dynamically redefine business logic implemented as rules interpreted by a transaction log monitor. A further benefit is harnessing the metadata intrinsic to a data warehouse to intelligently populate a database and to allow an additional level of responsiveness to changes in the structure of the database.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
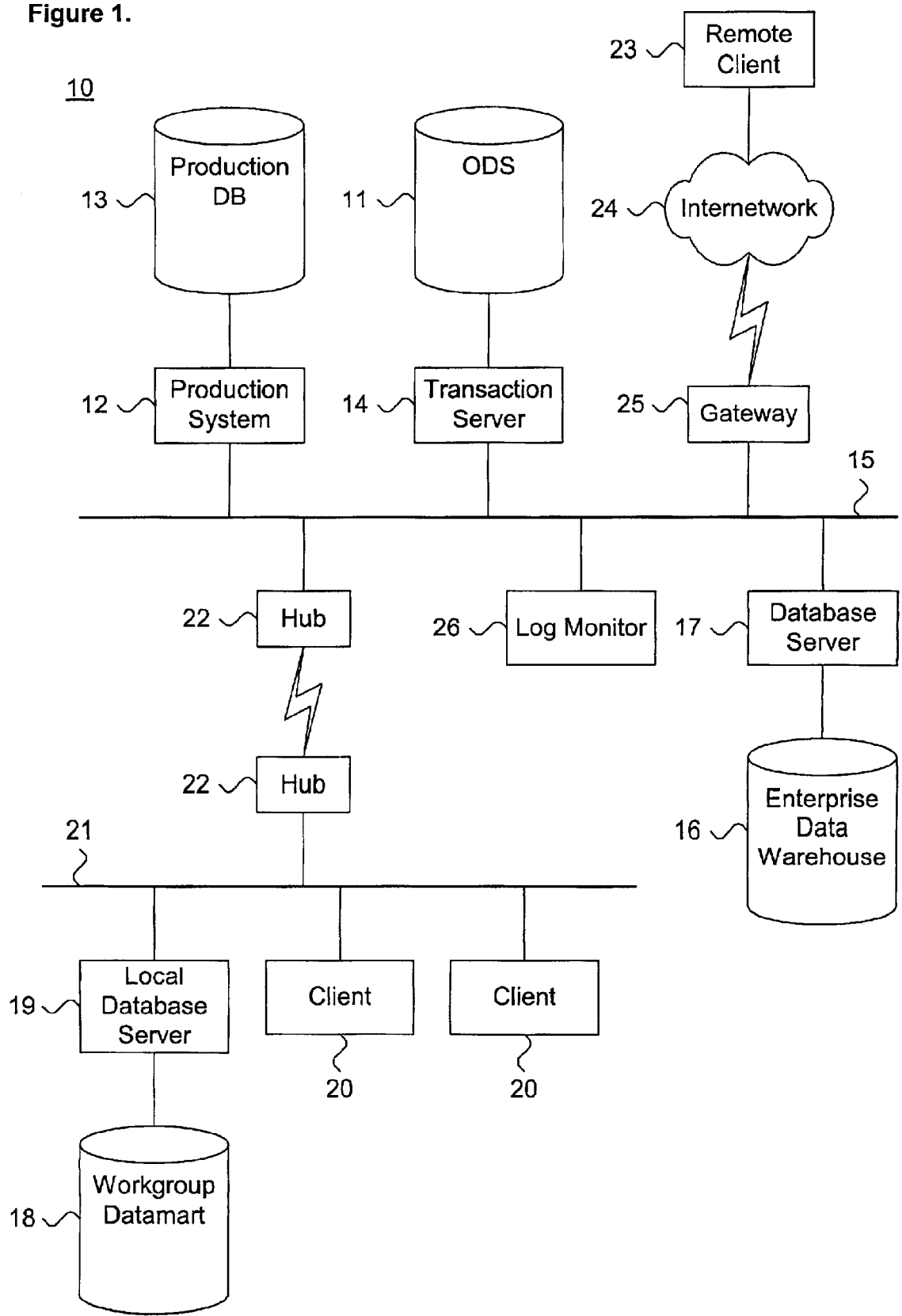
FIG. 1 is a block diagram showing a distributed computer environment, including a system for maintaining large-grained database concurrency with a log monitor incorporating dynamically redefinable business logic, in accordance with the present invention.

FIG. 1 is a block diagram showing a distributed computing environment 10, including a system for maintaining large-grained database concurrency with a log monitor incorporating dynamically redefinable business logic, in accordance with the present invention. An operational data store (ODS) 11 stores production data generated by a production system 12. The production system 12 can constitute an on-line transaction processing system for transacting electronic commerce (e-commerce), reservations, point of sale transactions, inventory control, factory and manufacturing operations, and similar types of activities.

For efficiency, the production system 12 maintains a local production database 13 within which production data is maintained.

To maintain a high level of responsiveness and availability, the operational data store 11 is coupled to a dedicated transaction server 14 that provides a high throughput interface to the operational data store 11. The production system 12 and transaction server 14 are interconnected via a network 15, such as an internetwork or an intranetwork, as are known in the art.

The production data stored in the operational data store 11 is periodically replicated into an enterprise data warehouse 16. Unlike the operational data store 11, which only contains production data, the enterprise data warehouse 16 contains both direct and derivative data values, known as informational data, for use by decision support and on-line analytical processing systems. A database server 17 is coupled to the enterprise data warehouse 16 for executing data manipulation language (DML) queries against the enterprise data warehouse 16. The database server 17 is also interconnected to the other systems via the network 15.

The enterprise data warehouse 16 can be hierarchically structured with secondary databases, such as a workgroup datamart 18. While the enterprise data warehouse 16 contains informational data pertaining to all aspects of the corporate activities, each work group datamart 18 is a subset presenting a specialized view of the informational data for a specific subject area, such as employee records, sales revenue figures, and the like. The work group datamart 18 could be structured in a local network environment with a dedicated local database server 19 interconnected with a plurality of clients 20 over a local network 21. In turn, the local network 21 can be interconnected with the corporate network 15, via a series of hubs 22.

Finally, the enterprise data warehouse 16 and the work group datamart 18 can both be remotely accessed by a remote client 23, for instance via an internetwork 24, such as the Internet, coupled to the corporate network 15 through a gateway 25.

The operational data store 11 is characterized by a high degree of volatility and change with 100% availability and guaranteed response times. Conversely, the enterprise data warehouse 16 performs flexible operations responsive to ad hoc queries posed by the various clients 20 and remote clients 23.

The informational data stored in the enterprise data warehouse 16 must be periodically refreshed with production data retrieved from the operational data store 11. Depending upon the system load on the operational data store 11, the retrieval of production data may be impractical during peak operational times and at best tolerated during off-peak periods. Consequently, a log monitor 26 can provide large-grained database concurrency between the operational data store 11 and enterprise data warehouse 16 by indirectly updating the informational data.

The log monitor 26 reads log entries generated by the transaction server 14 as a by-product of transaction processing. Individual log entries are retrieved and analyzed by applying selection criteria implementing business logic into a dynamically redefinable rule set, as further described below with reference to FIG. 3. Updated records are generated from those log entries satisfying the selection criteria for updating the informational data in the enterprise data warehouse 16.

While the specific forms of databases, including operational data store 11, enterprise data warehouse 16, and workgroup datamart 18, are referenced in relation to the described embodiment, one skilled in the art would recognize that other forms of structured databases could also be used within the general parameters and characteristics outlined herein. In addition, other networked topologies and system configurations can also be used.

The individual computer systems, including production system 12, transaction server 14, database server 17, local database server 19, clients 20 and remote client 23, are general purpose, programmed digital computing devices consisting of a central processing unit (CPU), random access memory (RAM), non-volatile secondary storage, such as a hard drive or CD-ROM drive, network interfaces, and peripheral devices, including user-interfacing means, such as a keyboard and display. Program code, including software programs, and data are loaded into the RAM for execution and processing by the CPU and results are generated for display, output, transmittal, or storage.

Figure 2:
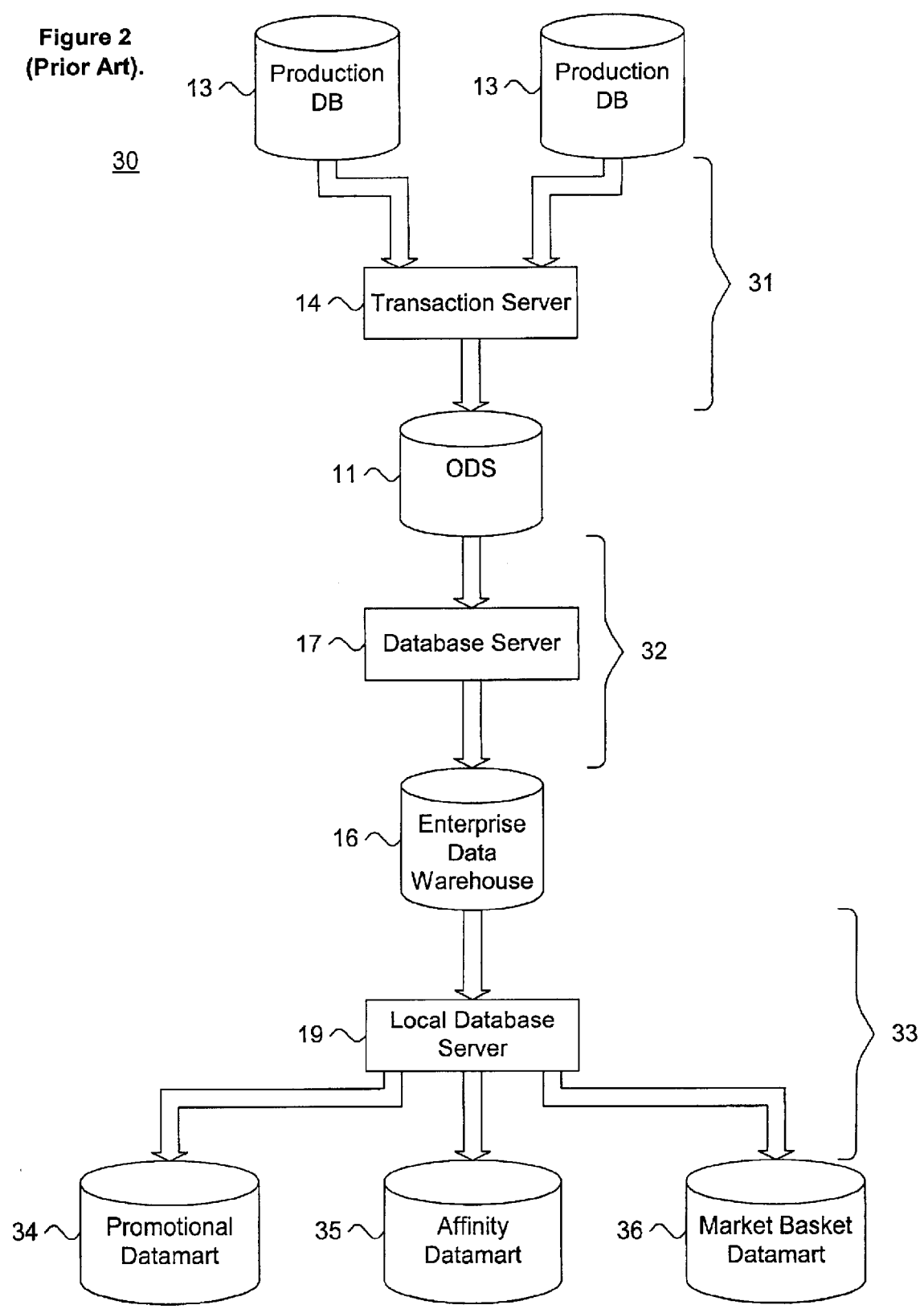
FIG. 2 is a functional block diagram showing a prior art multi-tiered database architecture.

FIG. 2 is a functional block diagram showing a prior art multi-tiered database architecture 30. Production and informational databases are structured into several tiers to distribute the database updating and retrieval workload, such as described in R. Orfali, "Client/Server Survival Guide," Chs. 12–13, John Wiley & Sons, Inc. (3d ed. 1999), the disclosure of which is incorporated by reference. A plurality of production databases 13 are served by a transaction server 14. Production data is stored and retrieved using the transaction server 14 into and from an operational data store 11 at high volume with maximum availability (step 31).

Periodically, a database server 17 "taps" informational data from the operational data store 11 (step 32). The raw production data copied, purified and cleansed into informational data maintained in an enterprise data warehouse 16. The retrieval of production data from the operational data store 11 is performed by a scheduled recurring process, such as a cron job, that periodically awakens to refresh the production data from the operational data store 11 into the enterprise data warehouse 16.

The process of downloading the production data into the enterprise data warehouse 16 is nontrivial and taxes computational, storage and network interfacing resources. The informational data retrieval and transformation executes business logic for selecting the appropriate data values from the operational data store 11. Each update can potentially implicate a massive volume of replicated information.

To mitigate the load on the operational data store 11, a series of specialized datamarts, such as, by way of example, a promotional datamart 34, an affinity datamart 35, and a market basket datamart 36, are created as a subset of the enterprise data warehouse 16 (step 33). Like the enterprise data warehouse 16, the datamarts 34–36 must also be periodically refreshed with informational data by a local data server 19. The use of the local database server 19 offloads a part of the specialized business logic necessary to further refine the informational data into formats usable by decision support and on-line transaction processing system (not shown).

This prior art approach attempts to balance the needs of the decision support and on-line analytical processing systems against the autonomous operation of the production systems by distributing and offloading the data replication and processing operations. However, the multi-tiered architecture 30 replicates the information needed in each of the specialized databases. In addition, multiple layers of business logic implementations are required to refresh and update the informational data. These layers can potentially include duplicated queries. A less duplicative solution is needed.

Figure 3:
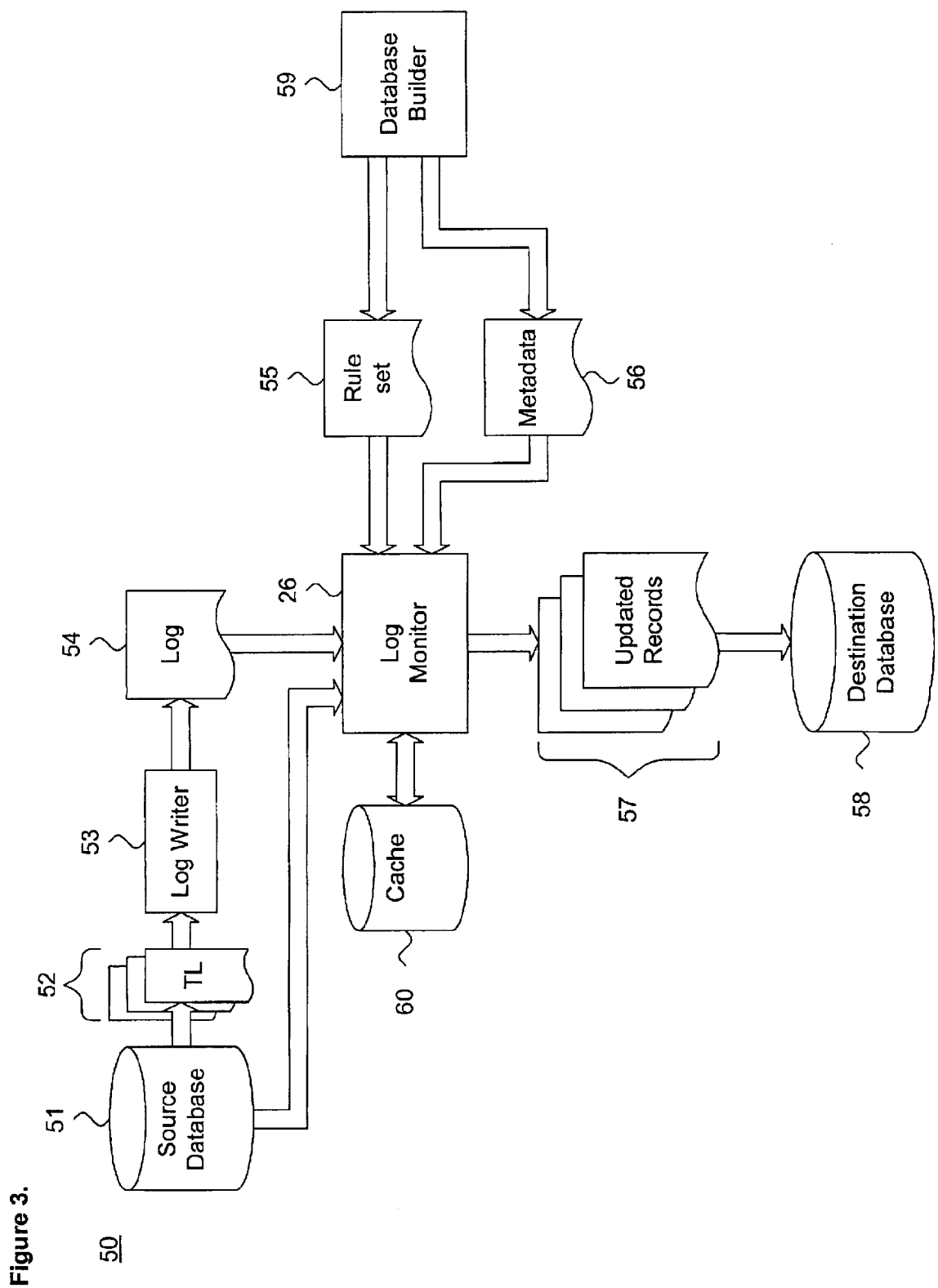
FIG. 3 is a block diagram showing the system for maintaining large-grained database concurrency of FIG. 1.

FIG. 3 is a block diagram showing the system 50 for maintaining large-grained database concurrency of FIG. 1. The core functionality of the system is performed by log monitor 26. A source database 51, typically an operational datastore 11 (shown in FIG. 2), or alternatively an enterprise data warehouse 16 or work group datamart 18, stores production (or informational) data. The stored data values change as transactions are committed to the source database 51. Upon commitment, a log writer 53 generates a log entry into a transaction log 54 to journal the transacted event. Each log entry includes transactional data, as further described below with reference to FIG. 4, that identifies the table, record and operations performed. The log writer 53 "flushes" a running series of transaction logs 52 (TL), generated on a continuous basis.

As log entries are written by the log writer 53 into the log 54, the log monitor 26 applies selection criteria incorporating business logic to the journaled log entries.

For each log entry that satisfies the selection criteria, the log monitor 26 retrieves the associated production (or informational) data from the source database 51 to generate updated records 57 for a destination database 58. The selection criteria utilized by the log monitor 26 is implemented as a rule set 55. The rule set incorporates business logic for selecting the transactions affecting production (or informational) data of interest to a decision support or on-line analytical processing system. In addition, the log monitor 26 utilizes metadata 56 describing the schema employed by the destination database 58.

The rule set 55 and metadata 56 can be dynamically redefined through a database builder tool 59. An example of a database builder tool 59 suitable for use in the present invention is the Oracle Warehouse Builder product, licensed by Oracle Corporation, Redwood Shores, Calif. A user can redefine the business logic and metadata using the database builder tool 59. Redefinitions are regularly forwarded to the log monitor 26. Individual rules in the rule set 58 implement the business logic as data manipulation language (DML) operations. The metadata 56 is used by the log monitor 26 to structure the updated records 57 into a format used by tables stored in the destination database 58. A structure of the rule set 55 is further described below with reference to FIG. 7.

Preferably, the metadata 56 includes four components, as follows. First, the metadata 56 describes the architectures of the source database 51 and destination database 58. The metadata 56 also includes network information describing the database links and aliases to other networks. The log 54 can also chronicle transactions performed on logically joined databases, such as in a distributed database environment. In addition, the metadata 56 includes job control and scheduling information specifying a frequency of execution for the implemented business logic against the journaled transaction entries. In the described embodiment, the job control information is specified in a higher order database manipulation language known as PL/SQL. Finally, the metadata 56 includes the actual source code for executing a selection criteria analysis. Other forms of metadata could also be used, for both production (or informational) data retrieval or recovery.

As an optimization to performance, the log monitor 26 can also include a cache 60 for staging information, including log entries and updated records 57. In the described embodiment, the log monitor 26 is implemented as a process separate from the transaction server 14 and database servers 17, 19 (shown in FIG. 1). The log monitor 26 operates in accordance with a sequence of process steps, further described below with reference to FIG. 8.

Figure 4:
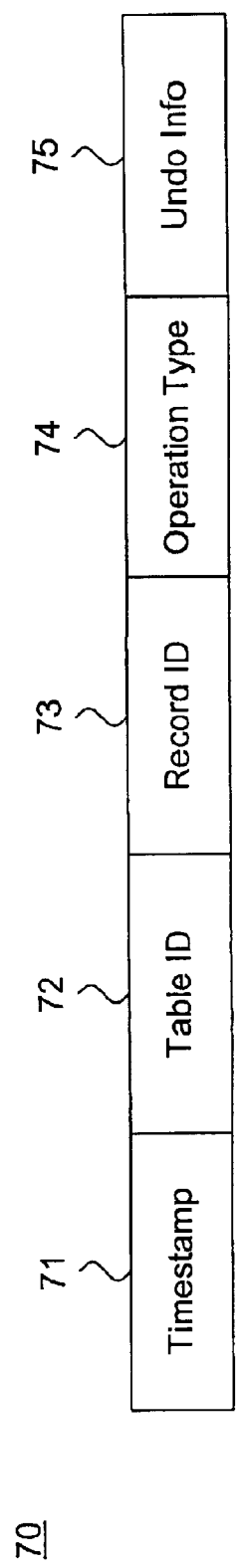
FIG. 4 is a data structure diagram showing a log entry used in the system of FIG. 3.

FIG. 4 is a data structure diagram showing a log entry 70 used in the system 50 of FIG. 3. Each log entry 70 includes, by way of example, five fields of information. A time stamp 71 chronicles the date and time that the associated transaction was committed to the source database 51. The table identifier 72 and record identifier 73 specify the source table and record entry or entries against which the transaction was committed. The operation type 74 identifies the committed transactions. Finally, the undo information 75 optionally describes the actual changes applied to the data in a format that allows the committed transaction to be unrolled. In the described embodiment, the undo information 75 identifies the table space contents and storage locations for the associated record. Using the undo information 75, the committed transaction can be unrolled and the original record entry recovered. The undo information 75 can also be used by the log monitor 26 (shown in FIG. 3) to determine whether the selection criteria of the rule set 55 has been satisfied for the current log entry 70.

Figure 5:
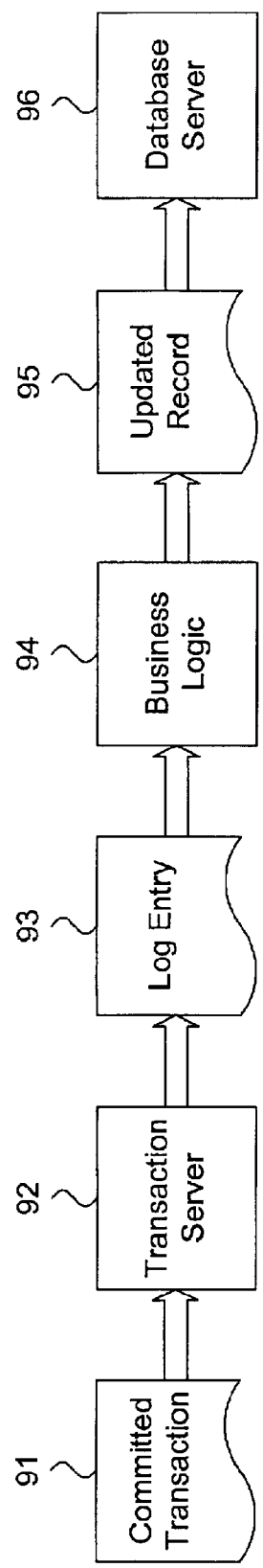
FIG. 5 is a process flow diagram showing informational database updating through log-based transaction monitoring.

FIG. 5 is a process flow diagram showing informational database updating through log-based transaction monitoring. Data is updated as updated records 57 from the source database 51 into the destination database 58. A committed transaction 91 is stored by the transaction server 92 into the source database 51. A log entry 93 is generated upon the commitment of each transaction 91 and is stored into the log 54 by a log writer 53 (shown in FIG. 3). The log monitor 26 applies business logic 94, as implemented in a rules set 55. Each log entry 93 satisfying the selection criteria is used to generate an updated record 95 that is stored into the destination database 58 by the database server 96.

Unlike the informational data update approach used in the prior art multi-tiered database architecture 30 (shown in FIG. 2), the present approach generates updated records 95 by indirectly deriving the informational data through the log entries 93. The log entries 93 are generated as a by-product of the transaction server 92. Consequently, the updated records 95 are generated at minimal cost to the transaction server 92 and avoids the data replication and potential duplicity of data and business logic inherent in the prior art multi-tiered database hierarchy.

Figure 6:
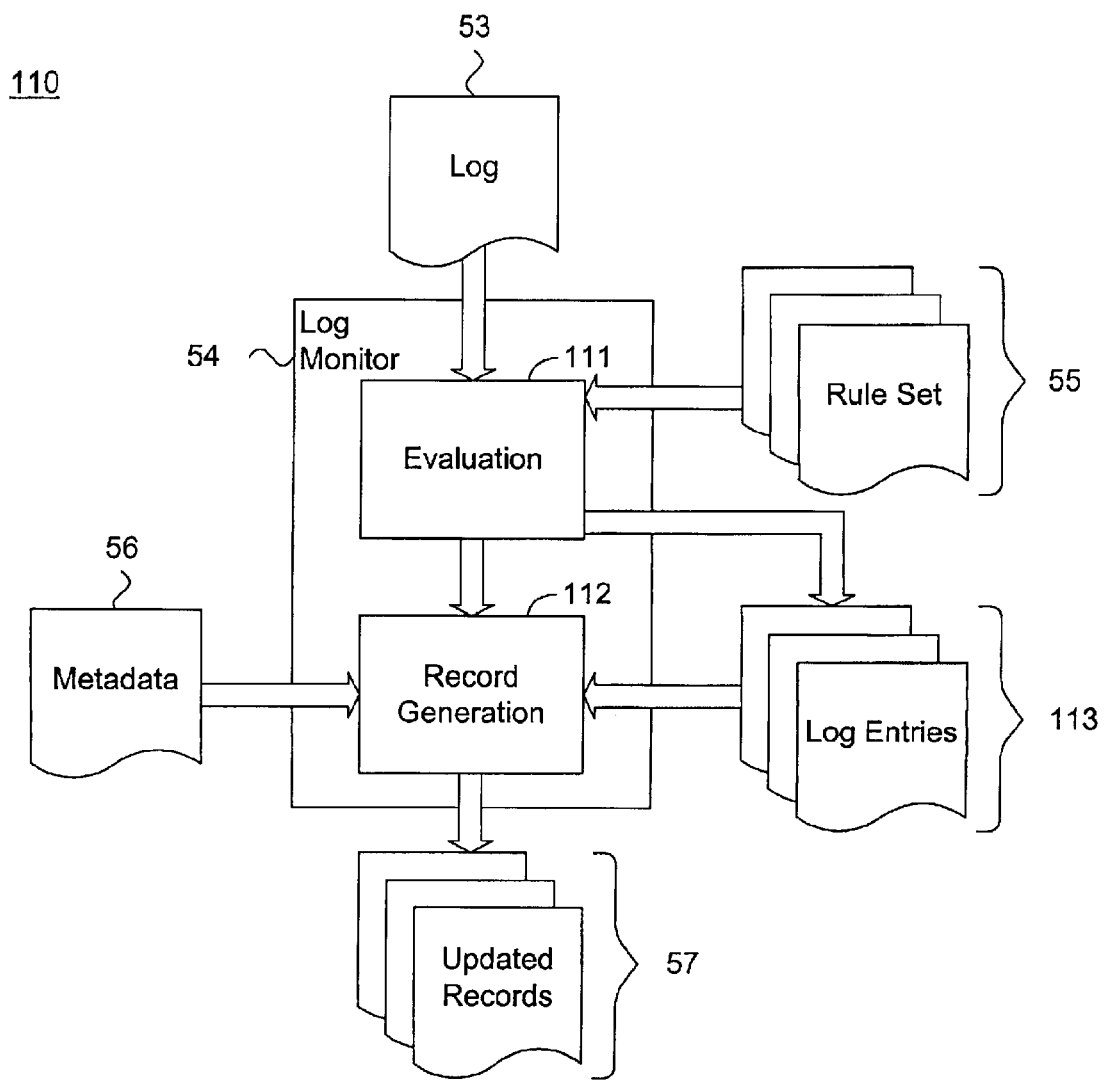
FIG. 6 is a functional block diagram showing the software modules of the system of FIG. 3.

FIG. 6 is a functional block diagram showing the software modules 110 of the system 50 of FIG. 3. The log monitor 26 includes two primary modules: an evaluation module 111 and a record-generation module 112. The evaluation module 111 receives the log entries in the log 53 as input. The transaction data included in each log entry 70 (shown in FIG. 4) is evaluated against the selection criteria presented by the rules set 55. Those log entries 113 that satisfy the selection criteria are forwarded to the record generation module 112. Using the schema description of the destination database 58, stored in the metadata 56, the record generation module 112 creates updated records 57 for updating the destination database 58.

In the described embodiment, the updated records 57 are sent via a file transfer process, such as in accordance with the File Transfer Protocol (FTP) or similar network transport protocol. Each module of the log monitor is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave.

Figure 7:
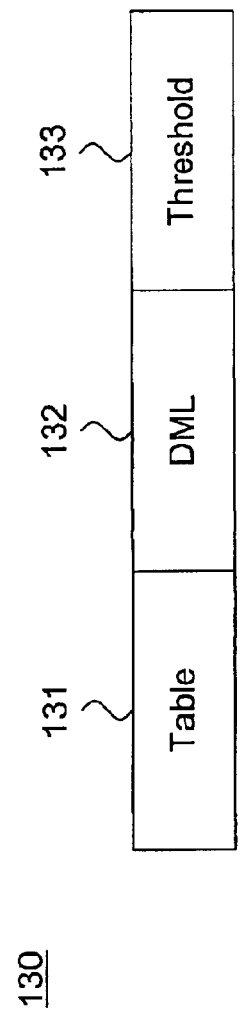
FIG. 7 is a data structure diagram showing a rule entry.

FIG. 7 is a data structure diagram showing a rule entry 130. By way of example, and at a minimum, each rule 130 identifies the table 131 within the source database 51 to which the selection criteria is to be applied. A set of data manipulation language (DML) statements 132 implements the business logic through which the selection criteria are expressed. As well, a threshold 133 can be included to allow the log monitor 26 (shown in FIG. 3) to quickly and efficiently filter the log entries based on a predefined boundary condition. Other rule formats are feasible.

Figure 8:
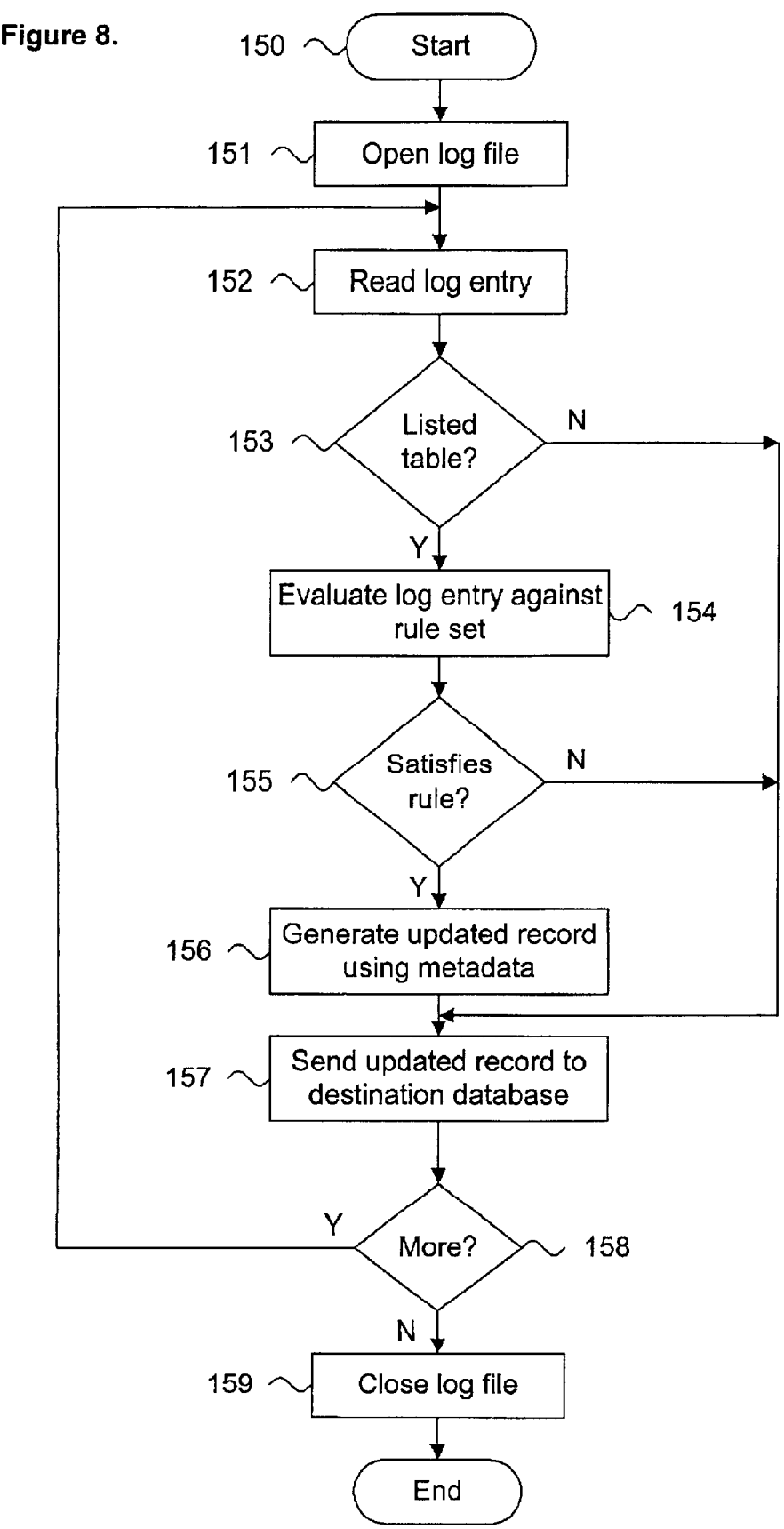
FIG. 8 is a flow chart showing a method for maintaining large-grained database concurrency with a log monitor incorporating dynamically redefinable business logic in accordance with the present invention.

FIG. 8 is a flow diagram of a method 150 for maintaining large-grained database concurrency with a log monitor 26 incorporating dynamically redefinable business logic in accordance with the present invention. Preliminarily, the log file 54 is opened by the log monitor 26 (block 151) preparatory to the application of the business logic. Each log entry (shown in FIG. 4) is then iteratively processed as follows.

During each iteration, each log entry 70 is first read by the log monitor 26 (block 152). The log entry 70 is evaluated to determine whether the entry describes a committed transaction 91 (shown in FIG. 5) affecting a table 131 (shown in FIG. 7) to which the selection criteria applies (block 153). If the log entry 70 does apply to a listed table 131 (block 153), the rule, as implemented in the data manipulation language procedure 132, is evaluated (block 154). If the selection criteria of the rule is satisfied (block 155), an updated record 57 is generated by the log monitor 26 using the metadata 56 (block 156) and the updated record is sent to the destination database 58 (block 157). Iterative processing continues (blocks 152–158) while there are more log entries 70 (block 158). Upon the processing of the last log entry 70 (block 158), the log file 54 is closed (block 159) and the routine terminates.

While the invention has been particularly shown and described as referenced to the embodiments thereof, those skilled in the art will understand that the foregoing and other changes in form and detail may be made therein without departing from the spirit and scope of the invention.

What is claimed is:

1. A method for using a log associated with a first database to update a second database, the method comprising the computer-implemented steps of:

based on said log that is associated with said first database, identifying first data;

generating second data based on said first data; and sending said second data to said second database.

2. The method of claim 1, further comprising the computer-implemented step of:

monitoring said log that is associated with said first database;

identifying a change to said log; and in response to identifying said change to said log, identifying said first data.

3. The method of claim 1, further comprising the computer-implemented steps of:

based on said first data, determining that one or more selection criteria are satisfied prior to performing said steps of generating and sending.

4. The method of claim 3, further comprising the computer-implemented step of:

modifying said one or more selection criteria based on a change to third data that includes at least one of (a) a rule set and (b) metadata.

5. The method of claim 4, wherein the step of modifying said one or more selection criteria includes the computer-implemented step of:

in response to receiving notification of a change to said third data, modifying said one or more selection criteria based on said change to said third data.

6. The method of claim 5, wherein said change is performed by a database builder in response to input from a user.

7. The method of claim 1, wherein the step of generating said second data based on said first data includes the computer-implemented step of:
generating said second data based on both said first data and third data.

8. The method of claim 7, wherein said third data is a rule set that includes one or more criteria for identifying said first data based on said log.

9. The method of claim 7, wherein said third data is metadata that includes at least one particular type of data selected from the group consisting of first database architecture data, second database architecture data, network topology data, job control data, scheduling data, and source code data.

10. The method of claim 1, wherein:
said second database is a particular database selected from the group consisting of a data warehouse and a datamart;
said first database includes production data; and
said second database includes informational data that is derived based on said production data.

11. The method of claim 1, further comprising the computer-implemented steps of:
after generating said second data, storing said second data in a cache;
prior to sending said second data, retrieving said second data from said cache.

12. The method of claim 1, further comprising the computer-implemented steps of:
prior to identifying said first data,
storing in a cache one or more log entries from said log, and
retrieving from said cache at least one log entry of said one or more log entries; and
wherein the step of identifying said first data further comprises the computer-implemented step of:
based on said at least one log entry, identifying said first data.

13. The method of claim 1, wherein:
said first database is a production database;
said second database is an informational database;
said first data is a log entry in said log;
said log entry is associated with a change to a first record stored in said first database;
said log entry includes undo information;
said first record includes production data;
said second data is a second record that is to be stored in said second database;
said second record includes at least one of a portion of said production data and informational data that is based on said production data;
said steps of generating and sending are performed when one or more selection criteria are satisfied based on said undo information; and
said one or more selection criteria are based on a rule set comprising dynamically redefinable business logic.

14. The method of claim 1, wherein:
the step of identifying first data further comprises the computer-implemented steps of:
opening said log that is associated with said first database; and
based on a rule set that specifies said one or more data selection criteria,
dynamically analyzing one or more log entries in said log to identify said first data; and
a log monitor performs said steps of dynamically analyzing, generating, and sending on a substantially continuous bases, thereby indirectly retrieving information from said first database for use in updating said second database to maintain large-grained concurrency between said first database and said second database.

15. A computer-readable medium carrying one or more sequences of instructions for using a log associated with a first database to update a second database, wherein execution of the one or more sequences of instructions by one or more processors causes the one or more processors to perform the steps of:
based on said log that is associated with said first database, identifying first data;
generating second data based on said first data; and
sending said second data to said second database.

16. The computer-readable medium of claim 15, further comprising instructions which, when executed by the one or more processors, cause the one or more processors to carry out the steps of:
monitoring said log that is associated with said first database;
identifying a change to said log; and
in response to identifying said change to said log, identifying said first data.

17. The computer-readable medium of claim 15, further comprising instructions which, when executed by the one or more processors, cause the one or more processors to carry out the step of:
based on said first data, determining that one or more selection criteria are satisfied prior to performing said steps of generating and sending.

18. The computer-readable medium of claim 17, further comprising instructions which, when executed by the one or more processors, cause the one or more processors to carry out the step of:
modifying said one or more selection criteria based on a change to third data that includes at least one of (a) a rule set and (b) metadata.

19. The computer-readable medium of claim 18, wherein the instructions for modifying said one or more selection criteria further comprise instructions which, when executed by the one or more processors, cause the one or more processors to carry out the step of:
in response to receiving notification of a change to said third data, modifying said one or more selection criteria based on said change to said third data.

20. The computer-readable medium of claim 19, wherein said change is performed by a database builder in response to input from a user.

21. The computer-readable medium of claim 15, wherein the instructions for generating said second data based on said first data further comprise instructions which, when executed by the one or more processors, cause the one or more processors to carry out the step of:
generating said second data based on both said first data and third data.

22. The computer-readable medium of claim 21, wherein said third data is a rule set that includes one or more criteria for identifying said first data based on said log.

23. The computer-readable medium of claim 21, wherein said third data is metadata that includes at least one particular type of data selected from the group consisting of first database architecture data, second database architecture data, network topology data, job control data, scheduling data, and source code data.

24. The computer-readable medium of claim 15, wherein:

said second database is a particular database selected from the group consisting of a data warehouse and a datamart;

said first database includes production data; and said second database includes informational data that is derived based on said production data.

25. The computer-readable medium of claim 15, further comprising instructions which, when executed by the one or more processors, cause the one or more processors to carry out the steps of:

after generating said second data, storing said second data in a cache;

prior to sending said second data, retrieving said second data from said cache.

26. The computer-readable medium of claim 15, further comprising instructions which, when executed by the one or more processors, cause the one or more processors to carry out the steps of:

prior to identifying said first data,
storing in a cache one or more log entries from said log, and
retrieving from said cache at least one log entry of said one or more log entries; and wherein the instructions for identifying said first data further comprise instructions which, when executed by the one or more processors, cause the one or more processors to carry out the step of:
based on said at least one log entry, identifying said first data.

27. The computer-readable medium of claim 15, wherein:

said first database is a production database;

said second database is an informational database;

said first data is a log entry in said log;

said log entry is associated with a change to a first record stored in said first database;

said log entry includes undo information;

said first record includes production data;

said second data is a second record that is to be stored in said second database;

said second record includes at least one of a portion of said production data and informational data that is based on said production data;

said instructions for generating and sending are executed by the one or more processors when one or more selection criteria are satisfied based on said undo information; and said one or more selection criteria are based on a rule set comprising dynamically redefinable business logic.

28. The computer-readable medium of claim 15, wherein:

the instructions for identifying first data further comprise instructions which, when executed by the one or more processors, cause the one or more processors to carry out the steps of:
opening said log that is associated with said first database; and
based on a rule set that specifies said one or more data selection criteria,
dynamically analyzing one or more log entries in said log to identify said first data; and a log monitor directs the one or more processors to execute the instructions for dynamically analyzing, generating, and sending on a substantially continuous bases, thereby indirectly retrieving information from said first database for use in updating said second database to maintain large-grained concurrency between said first database and said second database.

* * * * *